Figure 1:
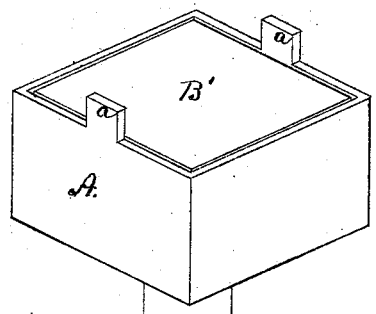

D. R. Pratt,
Screw Bolt.

No. 99,473. Patented Feb. 1. 1870.

Witnesses:
Godfrey Mathys.
Edw. F. Brown.

Inventor:
Daniel R. Pratt
by B. F. James,
his Atty.

United States Patent Office.

DANIEL R. PRATT, OF NEW YORK, N. Y.

Letters Patent No. 99,473, dated February 1, 1870.

---

IMPROVEMENT IN SPRING-HEADED SCREW-BOLT.

---

The Schedule referred to in these Letters Patent and making part of the same.

---

*To all whom it may concern:*

Be it known that I, DANIEL R. PRATT, of the city, county, and State of New York, have invented a new and useful Improvement in Screw-Bolts, and which I denominate as "Pratt's Spring-Headed Screw-Bolt;" and I do hereby declare the following to be a full, clear, and exact description of the construction and operation of the same, reference being had to the annexed drawings, making a part of this specification.

The nature of my invention consists in the application to the head of a bolt, of ordinary construction, a metallic cap, the top of which is open, and conforming, as near as may be, to the size and shape of the head of the bolt, a hole, the size of the shank of the bolt, being made in the bottom part of the cap, through which the bolt may pass, and placing within said cap India-rubber, coiled, or cup-shaped springs, before placing the bolt in the same, so that the lips formed upon the upper side of the cap, being bent over and upon the head of the bolt, the whole will form my spring-headed bolt.

In the drawings—

Figure 1 represents a perspective view of the cap and bolt, with the lips *a a* turned up.

Figure 2:
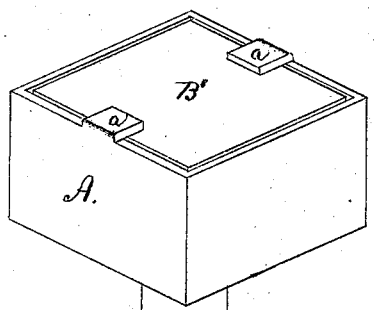

Figure 2, a similar view, with lips *a a* bent down upon the head of the bolt, securely fastening the cap to the bolt.

Figure 3:
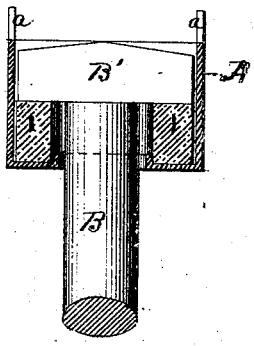

Figure 3 represents a cross-section of the cap A.

B is the bolt.

B′, the head of the bolt.

1 represents a rubber spring; and

*a a*, the ears of the cap.

Figure 4:
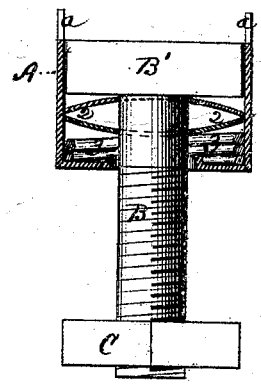

Figure 4 shows, also, a cross-section of the cap, containing within it different styles of springs.

2 represents the cup-form of spring, and 3, the coiled form of spring, either one of which, or the whole, may be used, if desired.

By this form of construction, I am enabled to adjust the head of the bolt evenly to any surface, being a plane, or approximating thereto evenly, and prevent an undue strain upon any particular point or portion of the bolt-head, whereas, without this arrangement the heads of bolts are liable to derangement and fracture.

It is also more important to thus protect the head of the bolts than it is the screw-nut C, for the latter can be readily replaced, while the former, if injured or broken, causes the loss of the whole bolt, or its repair is attended with very considerable expense.

The nut C can be fastened or prevented from turning by any well-known device, and the yielding nature of the springs, at the bolt-head, will tend to prevent jarring and dislocation of the bolt.

What I claim as my invention, and desire to secure by Letters Patent, is—

1. The construction and arrangement of the cap A, containing within it the springs 1, 2, 3, or either of them, when combined with the bolt B and its head B′, in the manner and for the purpose herein described.

2. The within-described method and means of attachment and securing the springs and bolt within the cap, in the manner and for the purposes herein set forth.

DANIEL R. PRATT.

Witnesses:
    B. F. JAMES,
    EDM. F. BROWN.